United States Patent Office 2,966,922
Patented Jan. 3, 1961

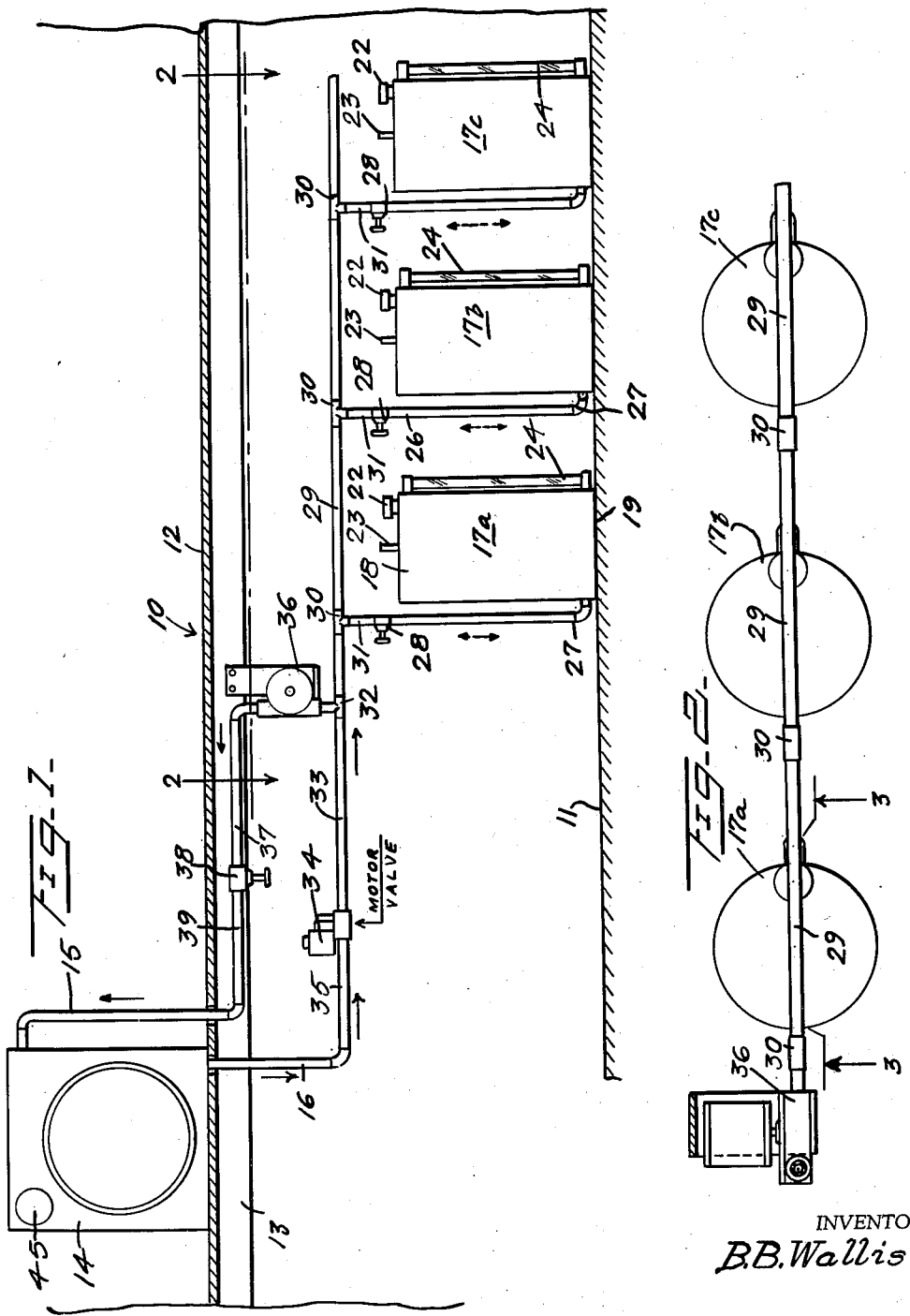

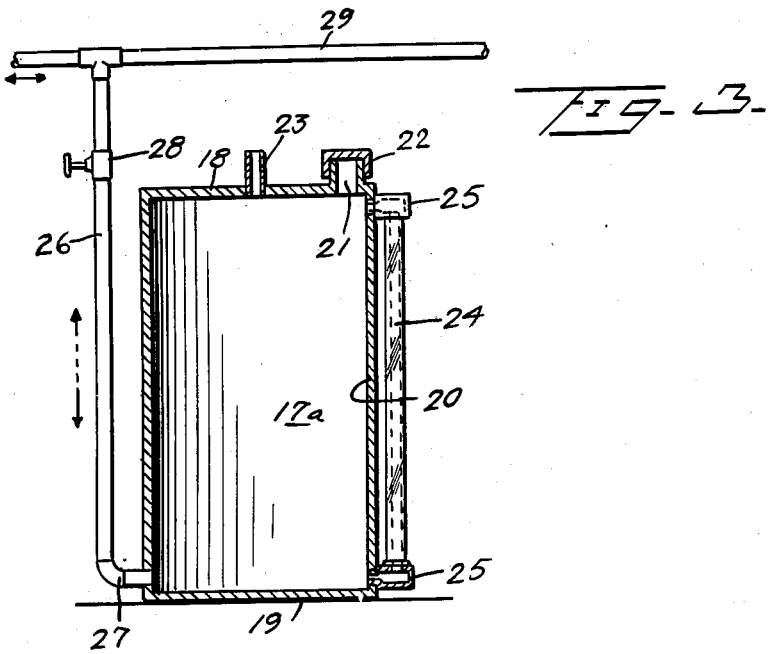
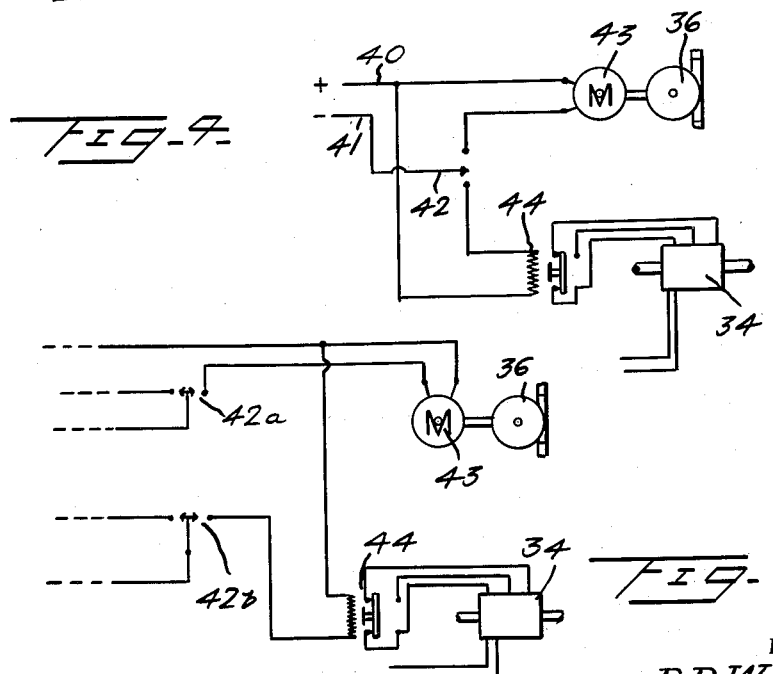

2,966,922

APPARATUS FOR STORING AND FEEDING TREATING LIQUIDS FOR A DRY-CLEANING MACHINE

Ben B. Wallis, 2628 E. 5th St., Tucson, Ariz.

Original application July 30, 1957, Ser. No. 675,048. Divided and this application Mar. 11, 1958, Ser. No. 720,747

1 Claim. (Cl. 137—263)

The present invention relates to an apparatus for storing and feeding liquids to a dry-cleaning machine, and particularly involving liquids of different characteristics and is a division of my copending application Serial No. 675,048, filed July 30, 1957, now abandoned, entitled Method and Apparatus for Storing and Feeding Treating Liquids for a Dry-Cleaning Machine.

The primary object of the invention is to provide an apparatus for storing and feeding liquids to a dry-cleaning machine whereby the clothing may be successively treated with liquids of different characteristics without mixing the liquids.

Another object of the invention is to provide a liquid storage and feeding apparatus for dry-cleaning machines wherein a single pump is used to supply a plurality of different liquids to the same dry-cleaning machine.

A further object of the invention is to provide a dry-cleaning apparatus for feeding treating liquids therein which is inexpensive to manufacture, simple to use, and which is completely effective in maintaining the treating liquids in separate condition.

Other objects and advantages will become apparent in the following specification when considered in the light of the attached drawings, in which:

Figure 1 is a fragmentary side elevation of the invention.

Figure 2 is an enlarged fragmentary horizontal cross-section taken along the line 2—2 of Figure 1, looking in the direction of the arrows.

Figure 3 is an enlarged fragmentary vertical cross-section taken along the line 3—3 of Figure 2, looking in the direction of the arrows.

Figure 4 is a schematic wiring diagram used for manual control of the apparatus.

Figure 5 is a slightly modified schematic wiring diagram illustrating the connection of the apparatus to the automatic control of the washing machine.

Referring now to the drawings in detail wherein like reference characters indicate like parts throughout the several figures, the reference numeral 10 indicates generally a dry-cleaning system constructed in accordance with the invention.

Referring particularly to Figure 1, the dry-cleaning apparatus 10 is illustrated as supported on a lower level 11, and partially on an upper level 12 constructed on the usual joist 13. A conventional dry-cleaning machine 14 is positioned on the upper level 12 and is provided with inlet pipe 15 and a drain pipe 16, each of which extend through the level 12 to a point spaced above the lower level 11.

A plurality of reservoir tanks illustrated at 17a, 17b and 17c are mounted in spaced parallel relation on the level 11, as best shown in Figure 1. The tanks 17a, 17b and 17c are identical in every respect, and the tank 17a illustrated in Figure 3 is illustrative of all of the tanks 17a, 17b and 17c.

Referring now particularly to Figure 3, the tank 17a has an upper wall 18, a lower wall 19, and a cylindrical side wall 20. A filler neck 21 is secured to the upper wall 18 and is closed by a screw cap 22.

A vent pipe 23 is connected to the top wall 18 and extends thereabove. A sight glass 24 extends vertically adjacent to the tank 17a and has its upper and lower ends connected by upper and lower fittings 25 to the tank 17a adjacent the upper and lower walls 18 and 19, respectively.

A vertical stand pipe 26 has its lower end connected by a fitting 27 to the reservoir tank 17a adjacent the bottom wall 19 thereof. A valve 28 is secured to the upper end of the stand pipe 26 above the top wall 18 of the tank 17a.

A manifold pipe 29 is provided with a plurality of T connections 30 in spaced relation therealong which are connected to the valves 28 by nipples 31. A T connection 32 is mounted on one end of the manifold pipe 29 and has a pipe 33 extending therefrom to a motor valve 34. The opposite side of the motor valve 34 is connected by a pipe 35 to the drain pipe 16.

A pump 36 is connected to the T 32 at one side and has a pipe 37 extending from the other side to a meter valve 38. A pipe 39 extends from the meter valve 38 to the inlet pipe 15 of the washing machine 14.

The valves 28 are hand operated, the valve 34 is electrically operated, and the valve 38 is hand pre-set to meter the desired quantity of material therethrough.

Referring now to the wiring diagram in Figure 4 of the drawings, the electric wire 40 and the electric wire 41 extend to a source of electricity at one end and are selectively coupled by means of a single-pole double-throw switch 42 to a motor 43 of the pump 36 and a relay 44 controlling the motor valve 34.

In Figure 5, switches 42a and 42b separately control the motor 43 and the relay 44 and are part of the timing device 45 on the washing machine 14.

The use and operation of the apparatus will now be described.

Treating liquids, such as dry-cleaning fluid, sizing fluid, mothproofing fluid, water repellent fluid, and flame proofing fluid, as well as other treating liquids, are placed in separate reservoirs such as 17a, 17b, 17c, and by selectively controlling the valves 28 the material in any one reservoir 17a, 17b, 17c can be fed to the washing machine 14 by the pump 36 through the metering valve 38.

The washing machine 14 is then operated in the normal manner for sufficient time to permit the treating fluid introduced therein to act in the desired manner on the clothing in the washing machine 14.

When it is desired to empty the treating fluid from the washing machine, the motor valve 34 is operated which drains the fluid by gravity from the washing machine 14 back to the tank 17a from whence it came. The washing machine is then operated in its extraction cycle and the extracted treating fluid passes through the motor valve 34 back to the tank 17a.

Obviously, by controlling the valves 28, successive treating fluids can be brought into contact with the apparel in the washing machine 14 without mixing the fluid to any great extent.

In the modification indicated in Figure 5, the pump 36 and the motor valve 34 are automatically controlled by the switches 42a, 42b conventionally found in the timing structure of the washing machine 14.

It should be understood that the present invention is operative when the liquid level of the storage tanks is below the bottom of the dry-cleaning machine and by reversing the pump and gravity feed lines, the storage tanks may be raised above the washing machine so as to feed fluid thereto by gravity and discharge it therefrom by the pump.

Having thus described the preferred embodiments of the invention, it should be understood that numerous structural modifications and adaptations may be resorted to without departing from the scope of the appended claim.

What is claimed is:

A dry-cleaning apparatus comprising a dry-cleaning machine, a plurality of reservoir tanks arranged adjacent to and below said dry-cleaning machine, a manifold pipe connecting each of said reservoir tanks, an inlet pipe connecting said manifold to said washing machine, an outlet pipe connecting said manifold to said washing machine, a pump connected in said inlet pipe for pumping fluid from said reservoir tanks to said washing machine, a motor actuated valve connected in said outlet pipe controlling the flow of fluid from said washing machine to said manifold pipe, means selectively controlling the actuation of said pump and said motor actuated valve, a hand controlled valve positioned between said manifold pipe and each of said reservoir tanks for controlling the flow of fluid between said reservoir tanks and said manifold pipe, and a meter valve in the inlet pipe between said pump and said washing machine.

References Cited in the file of this patent

UNITED STATES PATENTS

| | | |
|---|---|---|
| 1,404,467 | Mohr | Jan. 24, 1922 |
| 1,801,749 | McEachern | Apr. 21, 1931 |
| 1,892,441 | Wales | Dec. 27, 1932 |
| 2,078,384 | Jefferson | Apr. 27, 1937 |
| 2,516,825 | Hejduk | July 25, 1950 |
| 2,526,520 | Von Saspe | Oct. 17, 1950 |
| 2,558,628 | Reddin | June 26, 1951 |
| 2,578,994 | Dunaway | Dec. 18, 1951 |
| 2,685,294 | Gold | Mar. 3, 1954 |
| 2,730,126 | Jensen | Jan. 10, 1956 |
| 2,841,176 | Buss | July 1, 1958 |

FOREIGN PATENTS

| | | |
|---|---|---|
| 488,900 | Italy | Jan. 8, 1954 |